United States Patent
Okada et al.

(10) Patent No.: US 8,898,590 B2
(45) Date of Patent: Nov. 25, 2014

(54) INFORMATION INPUT DEVICE, ON-SCREEN ARRANGEMENT METHOD THEREOF, AND COMPUTER-EXECUTABLE PROGRAM

(75) Inventors: Mamoru Okada, Yokohama (JP); Hidetoshi Mori, Yamato (JP); Masaki Matsubara, Sagamihara (JP); Masahiro Tsukiyama, Yamato (JP)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 473 days.

(21) Appl. No.: 13/176,584

(22) Filed: Jul. 5, 2011

(65) Prior Publication Data

US 2012/0026200 A1    Feb. 2, 2012

(30) Foreign Application Priority Data

Jul. 5, 2010    (JP) .................................. 2010-153313

(51) Int. Cl.
*G06F 3/048*    (2013.01)
*G06F 3/0488*   (2013.01)
*G06F 3/01*     (2006.01)

(52) U.S. Cl.
CPC .................................. *G06F 3/04886* (2013.01)
USPC ........... 715/798; 715/788; 715/794; 715/796; 715/797; 715/799; 715/800; 715/802

(58) Field of Classification Search
USPC ......... 715/798, 788, 794, 796, 797, 799, 800, 715/802
See application file for complete search history.

(56) References Cited

U.S. PATENT DOCUMENTS

| | | | |
|---|---|---|---|
| 6,518,957 B1 * | 2/2003 | Lehtinen et al. | 345/173 |
| 7,737,958 B2 * | 6/2010 | Jeon et al. | 345/173 |
| 2006/0187320 A1 | 8/2006 | Misawa | |
| 2006/0218505 A1 * | 9/2006 | Compton et al. | 715/781 |
| 2007/0250786 A1 * | 10/2007 | Jeon et al. | 715/765 |
| 2008/0172633 A1 * | 7/2008 | Jeon et al. | 715/810 |
| 2009/0153438 A1 * | 6/2009 | Miller et al. | 345/55 |
| 2009/0213086 A1 * | 8/2009 | Chae et al. | 345/173 |
| 2010/0169535 A1 | 7/2010 | Saxby et al. | |
| 2011/0187651 A1 * | 8/2011 | Whitlow et al. | 345/173 |

FOREIGN PATENT DOCUMENTS

| | | |
|---|---|---|
| CN | 1499162 | 5/2004 |
| CN | 201467323 | 5/2010 |
| JP | 11-289484 | 10/1999 |
| JP | 2000-039964 | 2/2000 |
| JP | 2004-302124 | 10/2004 |
| JP | 2007-081556 | 3/2007 |
| JP | 2007-529810 | 10/2007 |
| WO | 2009/157592 | 12/2009 |

OTHER PUBLICATIONS

Peter Cohen, "Splashtop Remote Desktop for iPad Review", MacLife, Jul. 20, 2011 http://www.maclife.com/article/reviews/splashtop_remote_desktop_ipad.

* cited by examiner

*Primary Examiner* — Nicholas Augustine
(74) *Attorney, Agent, or Firm* — Kunzler Law Group

(57) ABSTRACT

Provided are an information input device, an on-screen arrangement method thereof, and a computer-executable program capable of preventing deterioration of operability even when an input disable region is set on a touch panel. An information input device capable of inputting information by an indicator touching a touch panel formed on a display screen includes an input disable region setting controller that sets an input disable region on a part of the touch panel and a display controller that rearranges an object being displayed on the display screen to avoid the set input disable region.

19 Claims, 8 Drawing Sheets

INFORMATION INPUT DEVICE, ON-SCREEN ARRANGEMENT METHOD THEREOF, AND COMPUTER-EXECUTABLE PROGRAM

CROSS-REFERENCE TO RELATED APPLICATIONS

This application is a national patent application and claims priority to Japanese Patent Application No. 2010-153313 entitled "INFORMATION INPUT DEVICE, ON-SCREEN ARRANGEMENT METHOD THEREOF, AND COMPUTER-EXECUTABLE PROGRAM" filed on Jul. 5, 2010 for Mamoru Okada et al. which is incorporated herein by reference.

FIELD

The subject matter disclosed herein relates to an information input device, an on-screen arrangement method thereof, and computer-executable program.

BACKGROUND

Description of the Related Art

Many modern electronic devices are capable of receiving input by a touch panel mounted on a display device. A touch panels may accept data input by the touch on the touch panel of a finger, a pen, or the like. Examples of information processing devices that incorporate touch panels include laptop personal computers ("PC"), mobile terminals, personal digital assistants ("PDA"), automated teller machines ("ATM"), and car navigation devices.

Because many modern electronic devices are small and designed to be hand-held, a hand or the like holding the device may cause erroneous or unwanted input. One solution that exists to prevent such erroneous operation is to set an input disable region around the frame of the touch panel where an operator is likely to touch.

Present solutions for preventing erroneous input, however, lead to degradation in operability. In presently available solutions, when the input disable region is set, in order to interact with a window or an icon in the input disable region, the input disable region setting must first be cleared. Additionally, if a part of the window is outside the input disable region, it is necessary to first move the window so that the area to be operated is also located outside the input disable region.

BRIEF SUMMARY

Based on the foregoing discussion, the inventors have recognized a need for an information input device, an on-screen arrangement method thereof, and a computer-executable program capable of preventing deterioration of operability even when an input disable region is set on a touch panel.

The embodiments of the present invention have been developed in response to the present state of the art, and in particular, in response to the problems and needs in the art that have not yet been fully solved by currently available solutions. Accordingly, the embodiments have been developed to provide an information input device, on-screen arrangement method thereof, and a computer-executable program for setting an input disable region on a touch panel that overcome many or all of the above-discussed shortcomings in the art.

One aspect includes an information input device capable of inputting information by an indicator touching a touch panel formed on a display screen, including: an input disable region setting controller for setting an input disable region on a part of the touch panel; and a display controller for rearranging an object being displayed on the display screen so as to avoid the set input disable region.

In one embodiment, the object to be rearranged is at least one of a window, an icon, a taskbar, and a button. In a further embodiment, the display controller executes at least one of moving and resizing the object when rearranging the object.

In another embodiment, the touch panel has a detection region corresponding to an effective display region of the display screen and an extension region surrounding the periphery of the detection region. When a touch of the extension region is detected, the display controller sets the detection region present around the touched position as the input disable region.

In an additional embodiment, when the input disable region setting is cleared, the display controller restores the arrangement of the object on the display screen.

Another aspect includes an on-screen arrangement method in an information input device capable of inputting information by an indicator touching a touch panel formed on a display screen, the method including the steps of: setting an input disable region on a part of the touch panel; and rearranging an object being displayed on the display screen so as to avoid the set input disable region.

Another aspect includes a computer-executable program for causing a computer to execute an on-screen arrangement method in an information input device capable of inputting information by an indicator touching a touch panel formed on a display screen, the method including the steps of: setting an input disable region on a part of the touch panel; and rearranging an object being displayed on the display screen so as to avoid the set input disable region.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
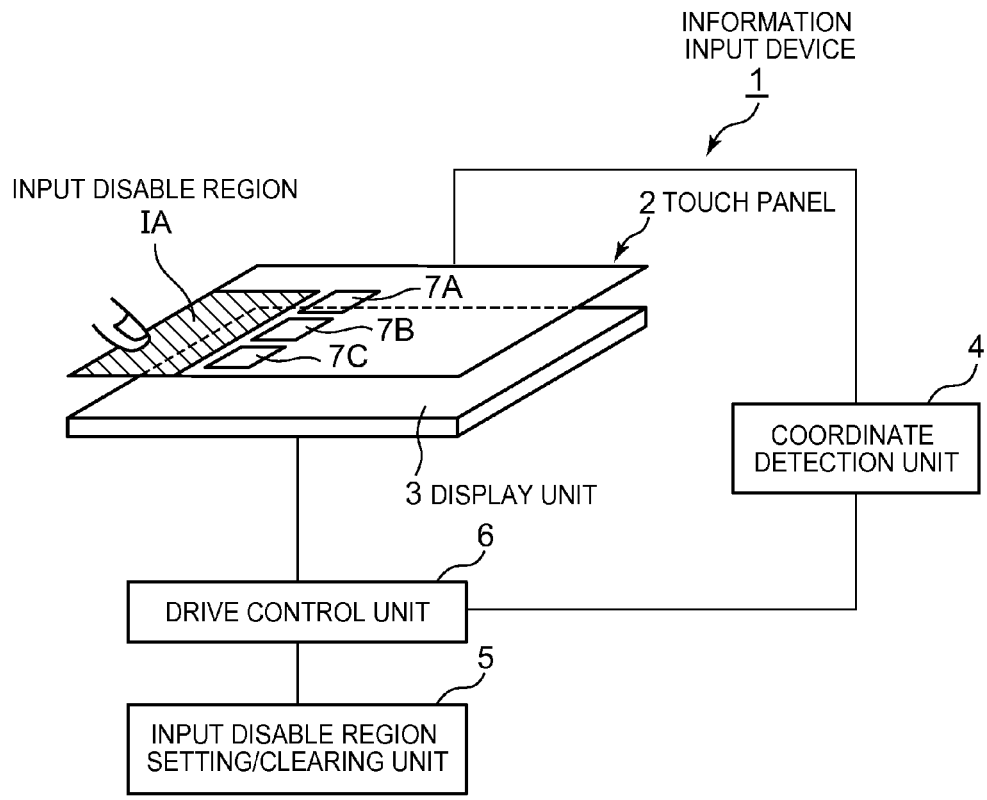
FIG. 1 is a conceptual diagram of an information input device according to an embodiment of the invention.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more storage devices storing machine readable code. The storage devices may be tangible, non-transitory, and/or non-transmission.

Any combination of one or more machine readable medium may be utilized. The machine readable storage medium may be a machine readable signal medium or a storage device. The machine readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof, A machine readable signal medium may be any storage device that is not a computer readable storage medium and that can communicate, propagate, or transport a program for use by or in connection with an instruction execution system, apparatus, or device.

Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code.

FIG. 1 is a conceptual diagram of one embodiment of an information input device. An information input device 1 includes a touch panel 2, a display unit 3, a coordinate detection unit 4, an input disable region setting/clearing unit 5, and a drive control unit 6. The information input device 1 can be formed through a hardware or software module or a combination thereof.

The display unit 3 is a flat panel-type display device such as, for example, a liquid crystal display ("LCD"), an organic electroluminescent ("OEL") display. The display unit 3 displays various types of information, such as characters or images, in accordance with control of the drive control unit 6.

The touch panel 2 is a resistive or capacitive touch panel and is mounted on the display unit 3 so as to enable an operator to touch it using an indicator, such as a finger or a pen, to select an object displayed on the display unit 3, such as a window, an icon, a button, or a taskbar, and perform an input operation.

The coordinate detection unit 4 detects a coordinate position touched by the finger on the touch panel 2 and outputs the coordinate position to the drive control unit 6.

The input disable region setting/clearing unit 5 sets an input disable region IA on a part of the touch panel 2 in response to a predetermined condition being satisfied in order to prevent erroneous input, operation, or the like. For example, the input disable region setting/clearing unit 5 may set the input disable region IA when a graphical user interface ("GUI") or hardware button (not shown) is pressed, and may clear the setting of the input disable region IA when the button is pressed again. Touch panel 2 may include a detection region corresponding to an effective display region of the display unit 3, and an extension region that surrounds the periphery of the detection region so as to detect an unintended contact. The input disable region setting/clearing unit 5 may set a detection region present around the detected coordinates as the input disable region IA in response to an input of the coordinates of the extension region being detected. The input disable region setting/clearing unit 5 may clear the setting of the input disable region IA in response to the cessation of input of the coordinates of the extension region.

The drive control unit 6 is configured to control the display of the display unit 3 so as to display characters, images, objects, and the like and perform various processes based on the coordinate position input from the coordinate detection unit 4. The drive control unit 6 disables an input of the coordinates of the input disable region IA set by the input disable region setting/clearing unit 5. When the input disable region IA is set, the drive control unit 6 determines whether an object being displayed on the display screen overlaps with the set input disable region IA and rearranges the object so as to avoid the input disable region IA.

Figure 2:
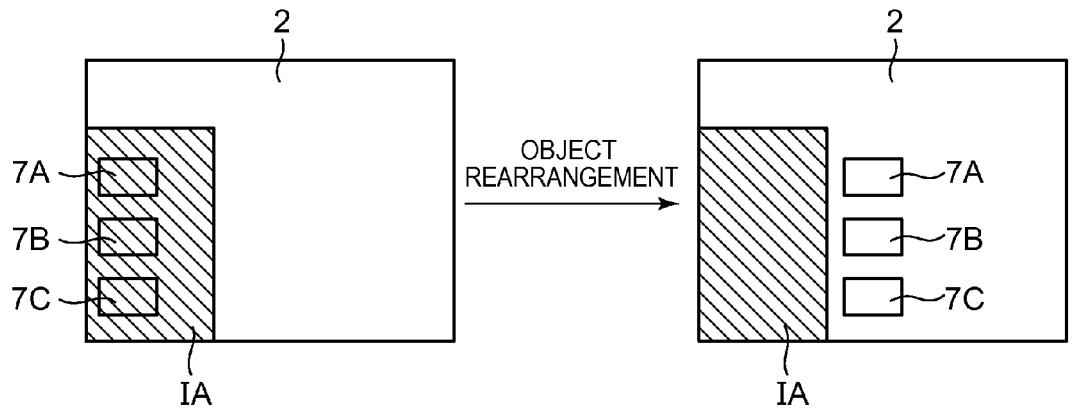
FIG. 2 is a diagram showing an example of rearranging objects when an input disable region is set.

FIG. 2 is a diagram showing an example of rearranging objects when an input disable region is set. The icons 7A to 7C are rearranged so as to avoid the input disable region IA in response to the input disable region IA being set, the input disable region IA covering the area occupied by icons 7A to 7C, and the information input device in a state where icons 7A to 7C are displayed. In this way, even when the input disable region IA is set, the operator can operate the icons 7A to 7C. When the set input disable region IA is cleared by the input disable region setting/clearing unit 5, the drive control unit 6 may restore the arrangement of the objects on the display unit 3.

The following modes can be considered as a method of rearranging (moving, resizing, and the like) the object so as to avoid the input disable region IA.

(1) Rearrangement Targets

The targets to be rearranged may be all objects on the screen, part of the objects on the screen, only active objects, or only the front-most window. The arrangement targets may be determined by the type of objects. The objects to be rearranged may be at least one or all of a window, an icon, a taskbar, and a button.

(2) Mode of Arranging so as to Avoid Input Disable Region IA

When an object partially or entirely overlaps with the input disable region IA, the object can be moved so that they do not overlap completely. When an object overlaps with the input disable region IA, the object may be moved by an amount such that the object can be operated. When an object partially overlaps with the input disable region IA and the object can be operated, the object need not be moved.

(3) Mode of Rearranging an Object

The object can be rearranged so that the present display state is maintained as much as possible in the following modes: (I) The object is first moved and then resized. (II) The object is first resized and then moved. (III) The object is moved but is not resized. (IV) The object is resized but is not moved.

The object may be rearranged within an input enable region regardless of the present display state. For example, windows may be displayed in an overlapping manner, arranged in the vertical direction, arranged in the horizontal direction, and icons may be displayed ordered by names and dates.

(4) Mode of Rearranging a Window

The window may always avoid the input disable region IA in the vertical direction or the horizontal direction, or may avoid the input disable region IA so as to be moved and resized as little as possible in the vertical or horizontal direction.

(5) Mode of Rearranging Multiple Objects

Rearranging objects to avoid the input disable region IA ("avoiding") may be done while a plurality of objects all have the same orientation, while all have vertical orientation, while all have horizontal orientation, or while there are both vertical and horizontal orientations. Furthermore, a plurality of objects may choose the minimum amount of movement and resizing (e.g., the movement amount may be determined based on the maximum movement amount, an average movement amount, or a total movement amount). In addition, the avoiding may be done by objects in the same direction with differing orientations, or by individual objects in different directions and differing orientations.

Figure 3:
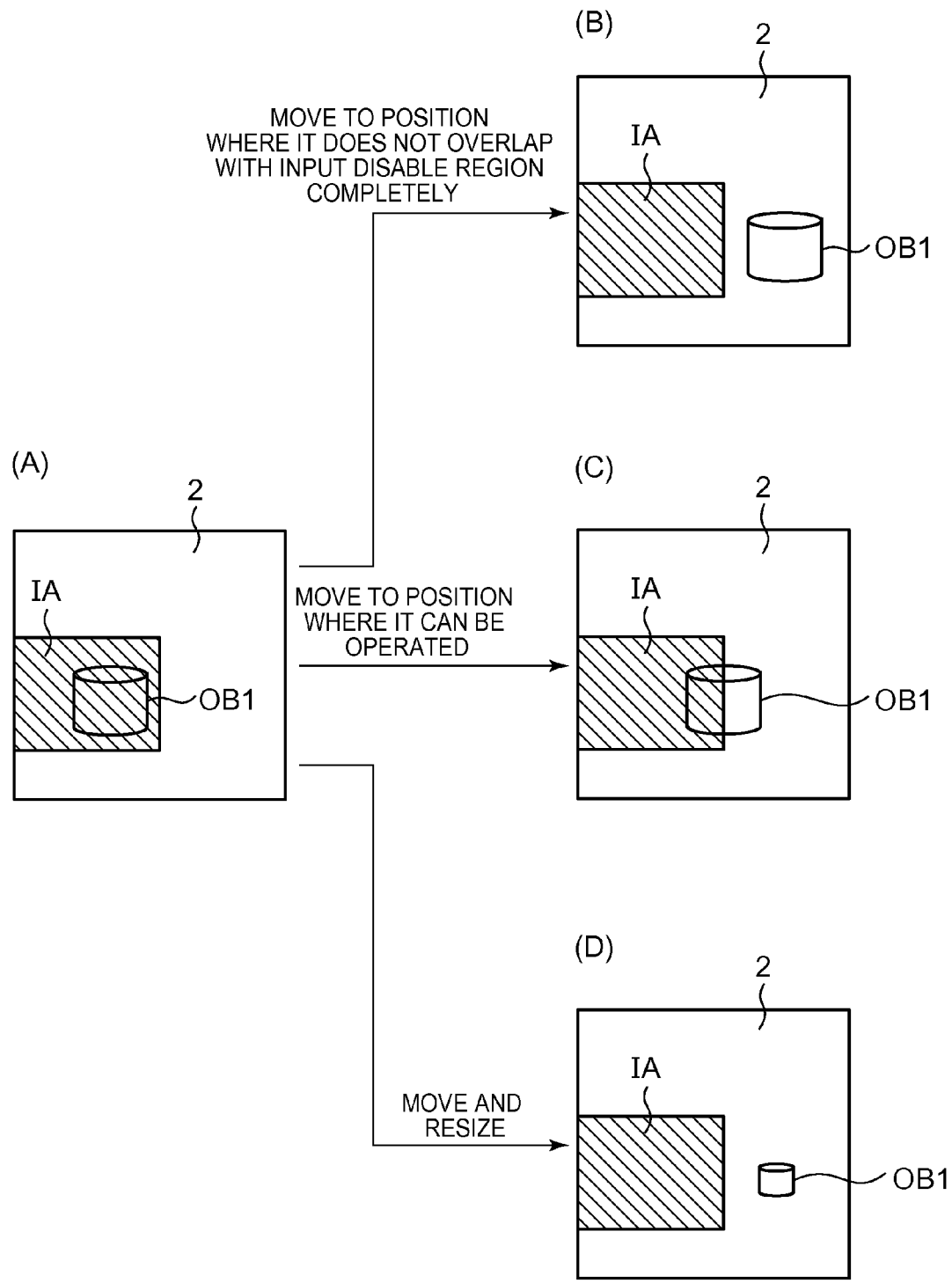
FIG. 3 is a diagram showing various modes of rearranging an object.
Figure 4:
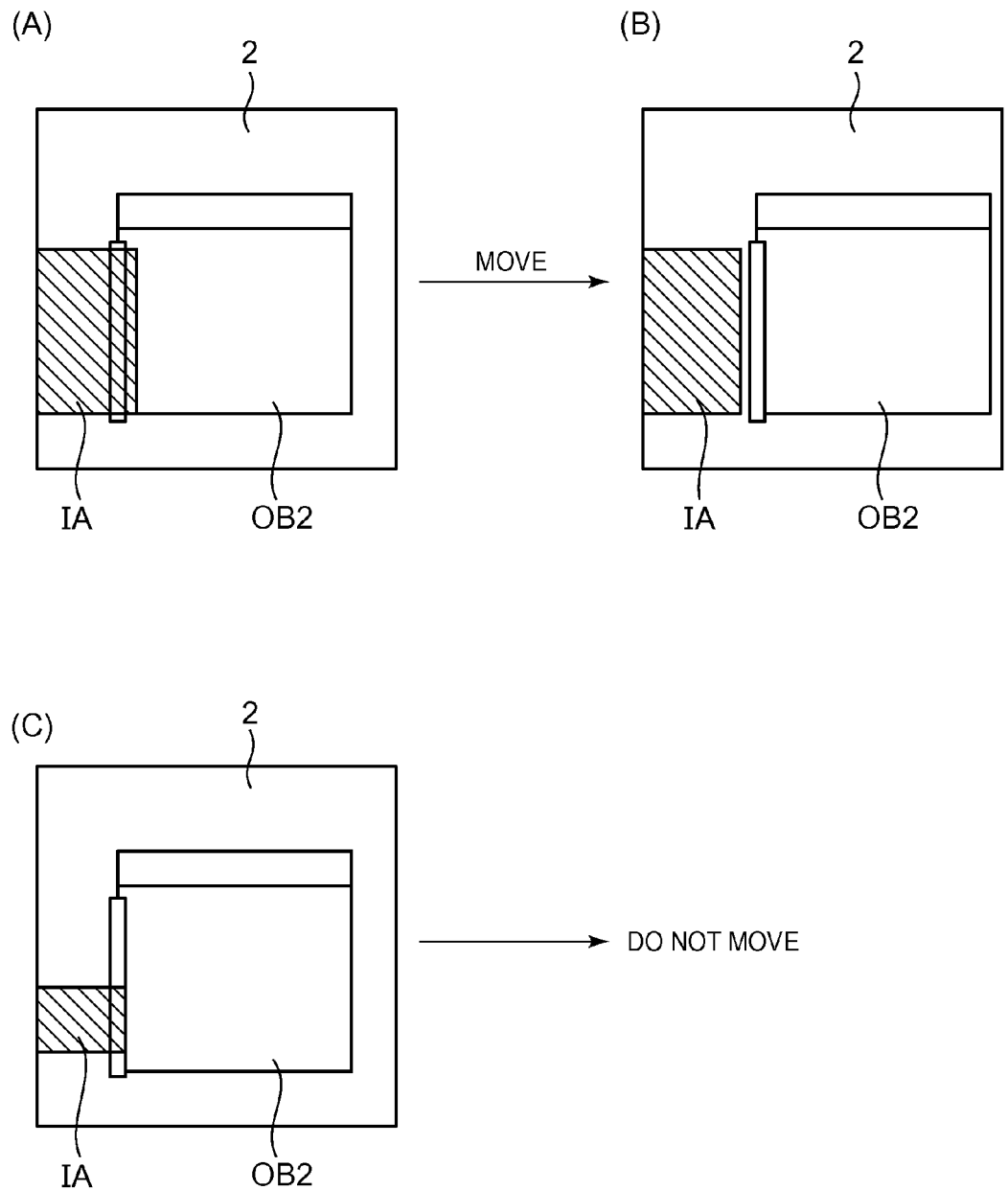
FIG. 4 is a diagram showing various modes of rearranging an object.
Figure 5:
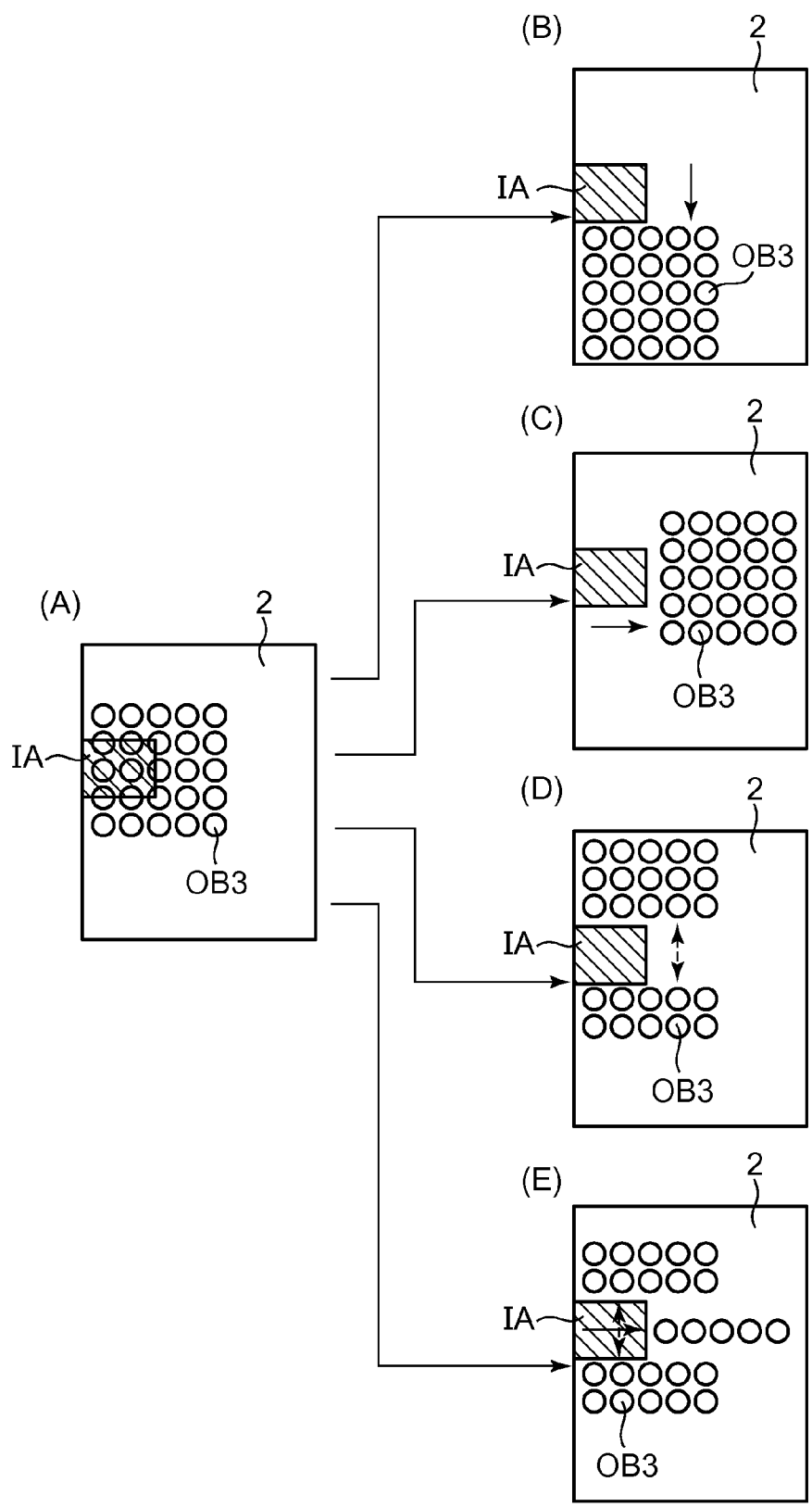
FIG. 5 is a diagram showing various modes of rearranging objects.

FIGS. 3 to 5 are diagrams showing various modes of rearranging an object.

In FIG. 3, when the input disable region IA is set above a folder OB1 in a state where the folder OB1 is displayed (FIG. 3(A)), the folder OB1 may be moved to a position where it does not overlap with the input disable region IA (FIG. 3(B)). Alternatively, the folder OB1 may be moved to a position where the folder OB1 partially overlaps with the input disable region IA but the folder OB1 can be operated (FIG. 3(C)). Finally, the folder OB1 may be resized and moved to a position where it does not overlap with the input disable region IA (FIG. 3(D)).

In FIG. 4, when the input disable region IA is set over approximately the entire toolbar of a window OB2 (FIG. 4(A)), the window OB2 may be moved so that the toolbar can be operated. When the input disable region IA is set over a part of the toolbar of the window OB2, and the toolbar can be operated even when it is not moved (FIG. 4(C)), the window OB2 need not be moved.

In FIG. 5, when the input disable region IA is set over part of a plurality of icons OB 3 in a state where the plurality of icons OB3 is displayed (FIG. 5(A)), all icons OB3 may be moved in the vertical direction to avoid the input disable region IA (FIG. 5(B)), may be moved in the horizontal direction to avoid the input disable region IA (FIG. 5(C)), may be moved in the upward and downward vertical directions to avoid the input disable region IA (FIG. 5(D)), or may be moved both horizontally and vertically to avoid the input disable region IA (FIG. 5(E)).

Figure 6:
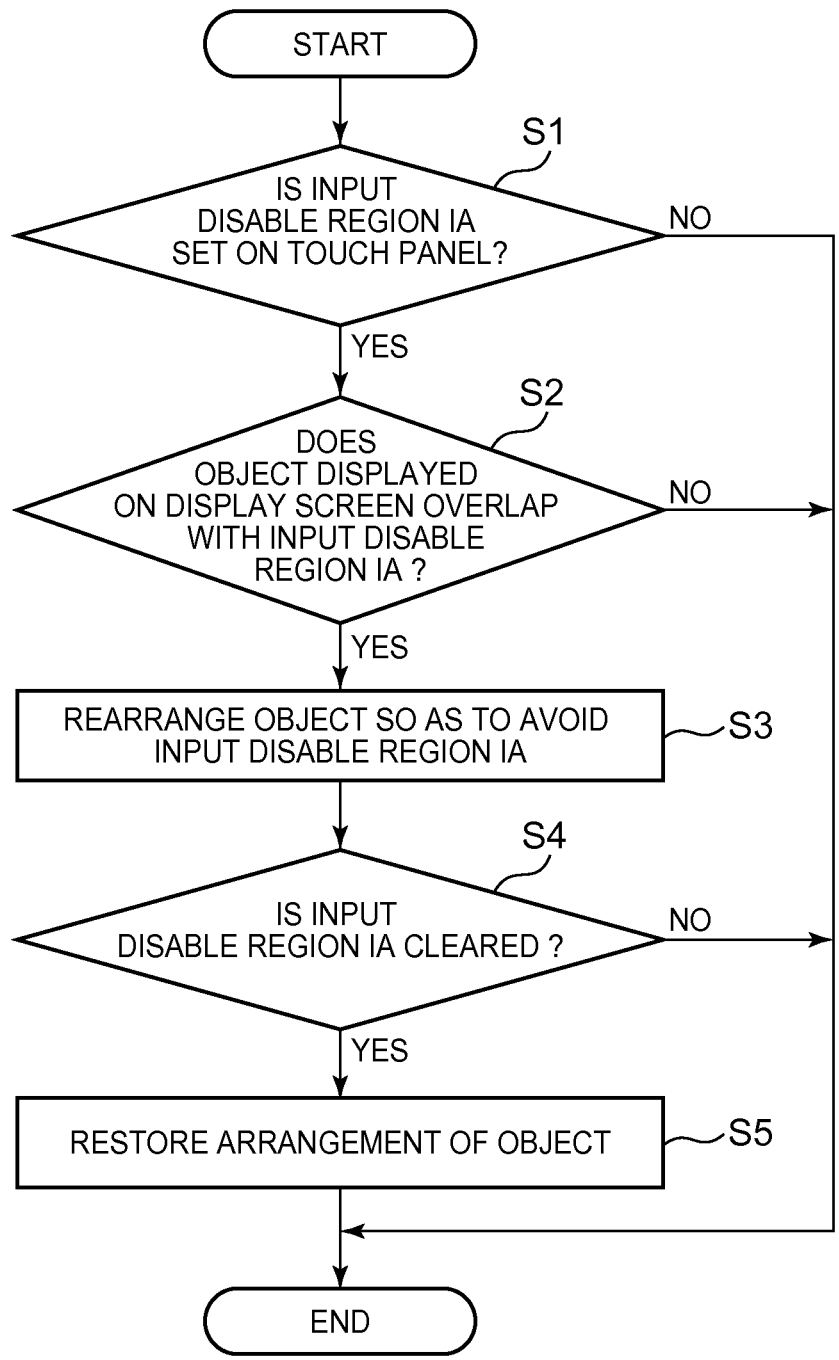
FIG. 6 is a flowchart showing an outline of the procedure of rearranging an object when an input disable region is set.

FIG. 6 is a flowchart showing an outline of one procedure by which the information input device 1 may rearrange objects when an input disable region is set. The flowchart shown in FIG. 6 is repeatedly executed at a predetermined cycle. Drive control unit 6 determines whether or not the input disable region IA is set on a part of the touch panel 2 (step S1).

When the input disable region IA is not set on a part of the touch panel 2 (step S1: "No"), the flow ends. When the input disable region IA is set on a part of the touch panel 2 (step S1: "Yes"), the drive control unit 6 determines whether an object being displayed on the display screen overlaps with the set input disable region IA (step S2). When the object being displayed on the display screen does not overlap with the set input disable region IA (step S2: "No"), the flow ends. When the object being displayed on the display screen overlaps with the set input disable region IA (step S2: "Yes"), the drive control unit 6 rearranges the object so as to avoid the input disable region IA (step S3).

The drive control unit 6 determines whether the set input disable region IA is cleared or not (step S4). When the set input disable region IA is not cleared (step S4: "No"), the flow ends. When the set input disable region IA is cleared (step S4: "Yes"), the drive control unit 6 restores the arrangement of the object on the display screen (step S5).

As described above, the input disable region setting/clearing unit 5 sets the input disable region IA on a part of the touch panel 2, and the drive control unit 6 rearranges the object being displayed on the display screen so as to avoid the set input disable region IA. The result is that even when an input disable region is set on the touch panel, it is possible to rearrange the object so that the object can be operated.

The drive control unit 6 executes at least one of moving and resizing an object when rearranging the object. This makes the object easy to see after the object is rearranged. Additionally, because the object is at least one of a window, an icon, a taskbar, and a button, the operator is able to operate various types of objects.

The touch panel 2 has a detection region corresponding to an effective display region of the display screen and an extension region surrounding the periphery of the detection region. When a touch of the extension region is detected, the drive control unit 6 sets the detection region present around the touched position as the input disable region IA. When the set input disable region IA is cleared by the input disable region setting/clearing unit 5, the drive control unit 6 restores the arrangement of the object on the display screen. This enables the operator to perform operations on the screen arrangement before the input disable region IA is set.

Figure 7:
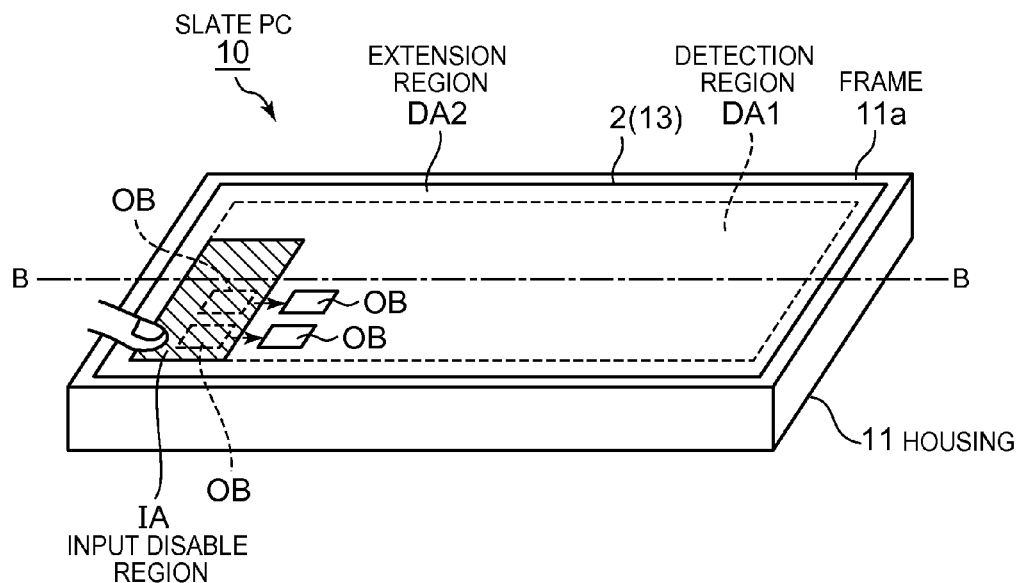
FIG. 7 is a schematic perspective view of a slate PC to which an information input device according to the embodiment is applied.
Figure 8:
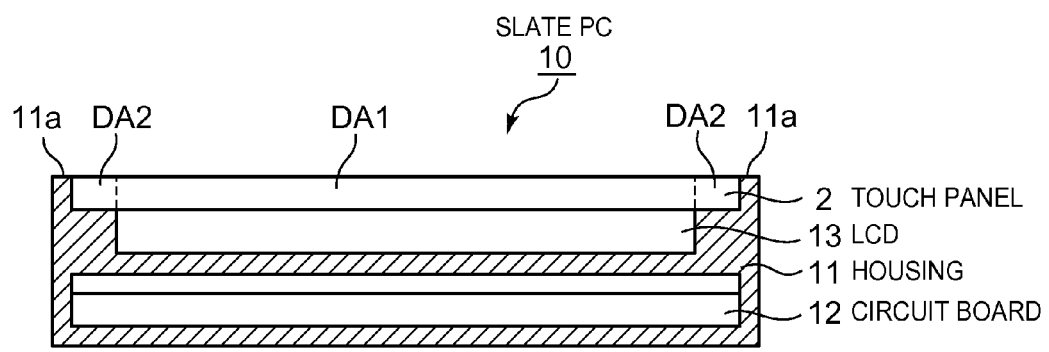
FIG. 8 is a schematic cross-sectional view taken along the line B-B in FIG. 7.

FIG. 7 is a schematic perspective view of a slate PC with an embodiment of the information input device. FIG. 8 is a schematic cross-sectional view taken along the line B-B in FIG. 7.

As shown in FIGS. 7 and 8, a slate PC 10 includes an approximately rectangular housing 11 containing a circuit board 12, an LCD 13 as a display unit, and a touch panel 2. The touch panel 2 is disposed approximately on the same plane as a frame 11a of the housing 11. The touch panel 2 has a structure in which a transparent conductor and a protective film are stacked on a glass substrate.

The touch panel 2 includes a detection region larger than the effective display region of the LCD 13, consisting of a detection region DA1 corresponding to the effective display region and an extension region DA2 surrounding the periphery of the detection region DA1. The detection region DA1 is a region for performing an operation input. The extension region DA2 is a region for detecting an unintended contact, such as a finger touch, by a user. The extension region DA2 is preferably printed in a dark color so as to indicate to the user that the extension region is not the operation screen. The user can operate the slate PC 1 in a manner similar to operation with a keyboard or a mouse by operating the detection region DA1 of the touch panel 2 with a finger.

When the finger of the user touches the extension region DA2 of the touch panel 2, and a coordinate position in the detection region DA1 near the touched coordinate position detected in the extension region DA2 is touched, the periphery of the touched detection region DA1 is set as the input disable region IA. In response to the activation of the input disable region IA, it is determined whether an object OB being displayed on the LCD 13 overlaps with the set input disable region IA. If the object OB is determined to overlap with the set input disable region IA, the object OB is rearranged so as to avoid the input disable region IA.

Figure 9:
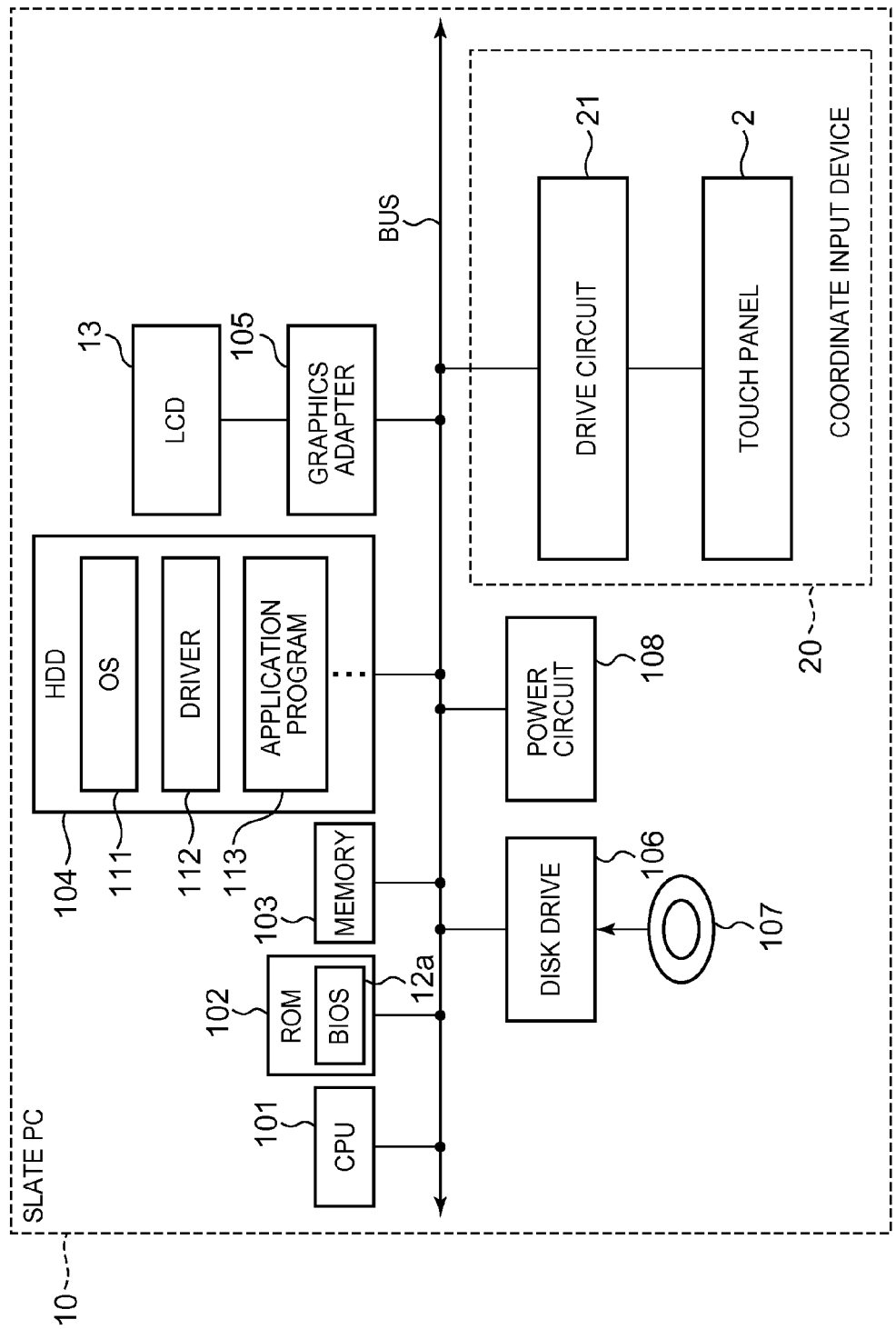
FIG. 9 is a schematic diagram showing a hardware configuration of the slate PC shown in FIG. 7.

FIG. 9 is a schematic diagram showing a hardware configuration of the slate PC 10 shown in FIG. 7. As shown in FIG. 9, the slate PC 10 includes a central processing unit ("CPU") 101, a ROM 102, a memory 103, a hard disk ("HDD") 104, the LCD 13, a graphics adapter 105, a coordinate input device 20, a disk drive 106, and a power circuit 108. The respective parts are directly or indirectly connected to each other through a bus.

The CPU 101 controls the overall operation of the slate PC 1 with an operating system ("OS") 111 stored in the HDD 104 connected through the bus and performs a function of executing processing based on various programs stored in the HDD 104. The ROM 102 stores a BIOS (Basis Input/Output System) 102a, data, and the like.

The memory 103 is formed of a cache memory or a RAM and is a writable memory which is used as a read area of programs executed by the CPU 101 or a work area in which processing data of the programs is written.

The HDD (hard disk) 104 has a function of storing the OS 111 (for example, WINDOWS XP, WINDOWS VISTA, and WINDOWS 7) for controlling the overall operation of the slate PC 1, various drivers (for example, a display driver and a touch panel driver) 112 for controlling hardware of peripheral devices, and application programs 113 for executing the display processes of the display screen of the LCD 13 in accordance with instructions input from the coordinate input device 20 and other processes.

The graphics adapter 105 converts display information into video signals in accordance with control of the CPU 101 and output the converted video signals to the LCD 13. The LCD 13 has a function of display various types of information in accordance with control of the CPU 101.

The disk drive 106 reads or writes data from/to a disc 107, such as a CD-ROM or a digital versatile disc ("DVD"), which is loaded therein.

The power circuit 108 includes an AC adapter, an intelligent battery, a charger for charging the intelligent battery, a DC/DC converter, and the like and supplies power to respective devices in accordance with control of the CPU 101.

The coordinate input device 20 is a user interface for enabling a user to perform an input operation and is configured to allow a user to select an object such as various menus, icons, buttons, windows, taskbars, or keyboards displayed on the screen of the LCD 13 and perform an input operation or perform an on-screen operation such as scrolling or swiping.

The coordinate input device 20 includes the touch panel 2 and a drive circuit 21. The drive circuit 21 detects a coordinate position (X,Y) touched on the touch panel 2 and outputs the coordinate position to the CPU 101. The drive circuit 21 functions as the coordinate detection unit 4 shown in FIG. 1. The function of the drive circuit 21 may be realized by a computer executing a program.

The CPU 101 functions as the input disable region setting/clearing unit 5 and the drive control unit 6 shown in FIG. 1 by executing the programs stored in the HDD 104. The CPU 101 performs various processes based on an on-screen object (an icon, a taskbar, a button, or the like) corresponding to the coordinate position input from the coordinate input device 20. When a first coordinate position is input in the extension region DA2 of the touch panel 2, and a second coordinate position is input in the detection region DA1 at a position near the coordinate position in the detected extension region DA2, the CPU 101 sets the detection region DA1 present near the second coordinate position as the set input disable region IA. In addition, the CPU 101 determines whether an object OB being displayed on the LCD 13 overlaps with the set input disable region IA and rearranges the object OB so as to avoid the input disable region IA when the object OB overlaps with the input disable region IA. When the input of the detected coordinates of the detection region DA1 and the extension region DA2 disappears after the input disable region IA is set, the CPU 101 determines that the input disable region IA is no longer being contacted, and clears the setting of the input disable region IA. When the input disable region IA is cleared, the CPU 101 restores the arrangement of the object OB.

In addition, when the input disable region IA is set, the type of avoiding object and the avoidance mode can be set by a user on a setting screen (not shown). The CPU 101 moves a target object to avoid the input disable region IA in accordance with the settings (the avoiding object and the avoidance mode) on the setting screen. The previously described method can be used for determining the avoiding object and the avoidance mode.

Figure 10:
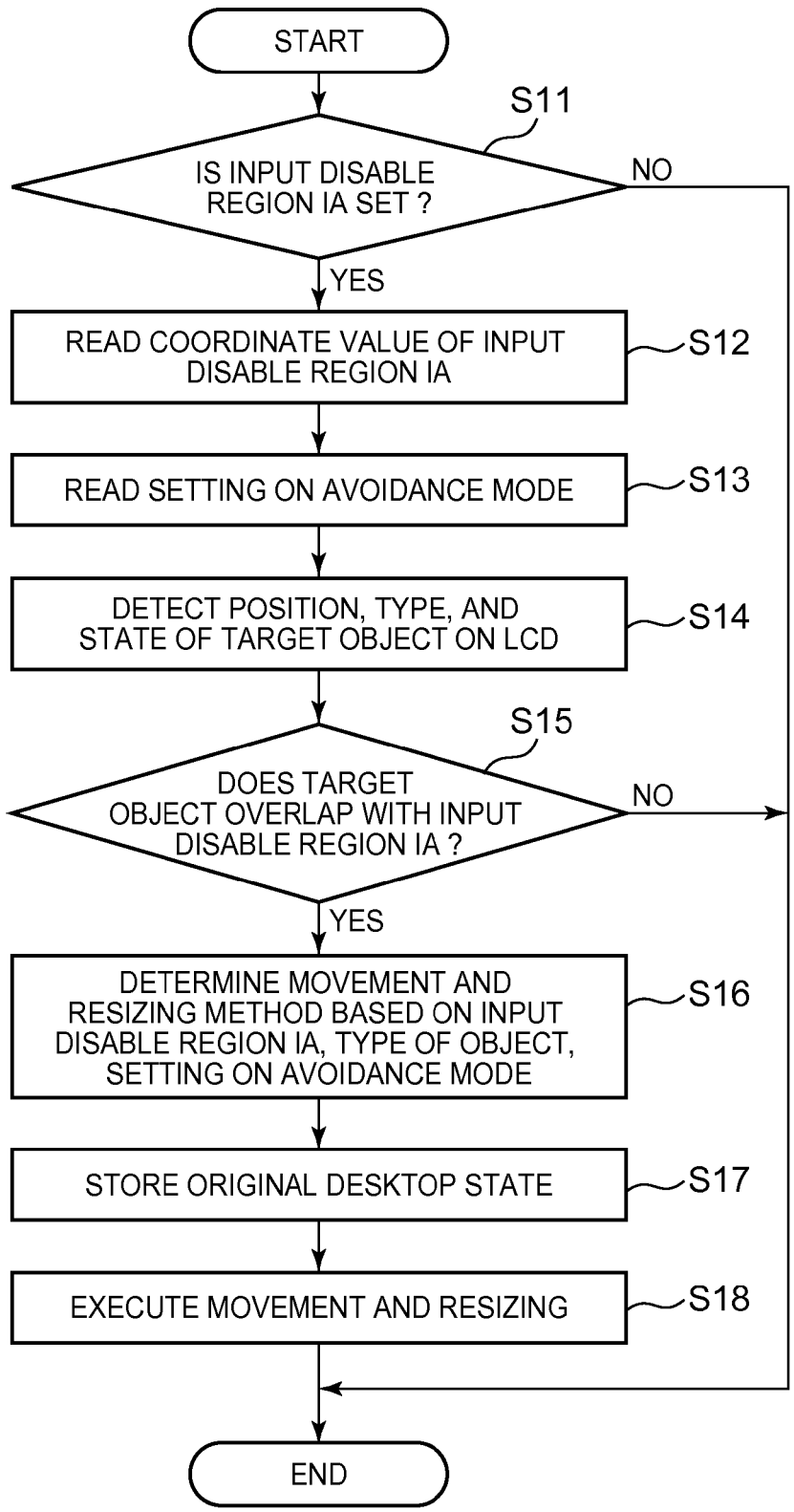
FIG. 10 is a flowchart showing an outline of the procedure in which the slate PC shown in FIG. 9 rearranges an object when an input disable region is set.

FIG. 10 is a flowchart showing an outline of the procedure in which the slate PC 1 shown in FIG. 9 rearranges an object when an input disable region is set. In FIG. 10, the CPU 101 determines whether the input disable region IA is set or not (step S11). When the input disable region IA is not set (step S11: "No"), the flow ends. When the input disable region IA is set (step S11: "Yes"), the CPU 101 reads the coordinate value of the input disable region IA (step S12), reads the setting on the avoidance mode (step S13), and detects the position, type, and state of a target object on the LCD 13 (step S14). The CPU 101 determines whether the target object overlaps with the input disable region IA or not (step S15). When the target object does not overlap with the input disable region IA (step S15: "No"), the flow ends. When the target object overlaps with the input disable region IA (step S15: "Yes"), the CPU 101 determines a rearrangement (moving and resizing) method based on the input disable region IA, the type of the object, and the setting on the avoid mode (step S16). Subsequently, the CPU 101 stores the original (present) desktop state (step S17). This is to rearrange the target object in the original state when the input disable region IA is cleared. The CPU 101 rearranges (moves or resizes) the target object in accordance with the determined rearrangement method.

In the embodiments described above, although the slate PC has been described, the invention is not limited to a slate PC. The information input device, the on-screen arrangement method thereof, and the computer-executable program according to the invention can be used in various devices having a touch panel. Examples of devices may include a laptop PC, a mobile terminal, a PDA, a navigation device, and the like.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An information input device comprising:
    a touch panel formed on a display unit that is capable of receiving positional touch information;
    an input disable region controller that sets an input disable region at a location of the touch panel where the positional touch information is actively received, wherein the input disable region is configured to be set and cleared;
    a display controller that determines if one or more objects are displayed within the input disable region and while maintaining a position and size of the input disable region moves the one or more objects to be displayed outside the input disable region, detects the positional touch information in the input disable region, and restores an original arrangement of the one or more objects moved by the setting of the input disable region in response to a command clearing the input disable region.

2. The information input device according to claim 1, wherein the display controller executes at least one of moving and resizing the one or more objects.

3. The information input device according to claim 1, wherein each of the one or more objects is one of a window, an icon, a taskbar, and a button.

4. The information input device according to claim 1, wherein the display controller moves one of all the objects on the display unit, part of the objects on the display unit, and only the front-most window on the display unit.

5. The information input device according to claim 1, wherein the input disable region is set by one of a graphical user interface and a hardware button, and wherein the input disable region setting is cleared by one of the graphical user interface and the hardware button.

6. The information input device according claim 1, wherein the touch panel has a detection region corresponding to an effective display region of the display unit and an extension region surrounding the periphery of the detection region, and wherein responsive to touch of the extension region, the display controller sets the detection region present around the touched position as the input disable region.

7. An on-screen arrangement method comprising:
    setting an input disable region at a location of a touch panel formed on a display unit that is capable of receiving positional touch information, wherein the input disable region is configured to be set and cleared;
    determining if one or more objects are displayed within the input disable region;
    while maintaining a position and size of the input disable region, moving the one or more objects to be displayed outside the input disable region;
    detecting the positional touch information in the input disable region; and
    restoring an original arrangement of the one or more objects moved by the setting of the input disable region in response to a command clearing the input disable region.

8. The on-screen arrangement method according to claim 7, wherein moving the one or more objects comprises resizing the one or more objects.

9. The on-screen arrangement method according to claim 7, wherein each of the one or more objects is one of a window, an icon, a taskbar, and a button.

10. The on-screen arrangement method according to claim 7, wherein moving the one or more objects comprises moving one of all of the objects on the display unit, part of the objects on the display unit, and only the front-most window on the display unit.

11. The on-screen arrangement method according to claim 7, wherein setting the input disable region is initiated by one of a graphical user interface and a hardware button.

12. The on-screen arrangement method according to claim 7, wherein the touch panel has a detection region corresponding to an effective display region of the display unit and an extension region surrounding the periphery of the detection region, and wherein responsive to touch of the extension region being detected, the detection region present around the touched position is set as the input disable region.

13. The on-screen arrangement method according to claim 7, wherein the method further comprises:
    clearing the input disable region setting.

14. A computer program product comprising a storage device storing machine readable code executed by a processor to perform the operations of:
    setting an input disable region at a location of a touch panel formed on a display unit that is capable of receiving positional touch information, wherein the input disable region is configured to be set and cleared;
    determining if one or more objects are displayed within the input disable region;
    while maintaining a position and size of the input disable region, moving the one or more objects to be displayed outside the input disable region;
    detecting the positional touch information in the input disable region; and
    restoring an original arrangement of the one or more objects moved by the setting of the input disable region in response to a command clearing the input disable region.

15. The computer program product of claim 14, wherein moving the one or more objects comprises resizing the one or more objects.

16. The computer program product of claim 14, wherein each of the one more objects is one of a window, an icon, a taskbar, and a button.

17. The computer program product of claim 14, wherein moving the one or more objects comprises moving at least one of all of the objects on the display unit, part of the objects on the display unit, and only the front-most window on the display unit.

18. The computer program product of claim 14, wherein the touch panel has a detection region corresponding to an effective display region of the display unit and an extension region surrounding the periphery of the detection region, and wherein responsive to touch of the extension region being detected, the detection region present around the touched position is set as the input disable region.

19. The computer program product of claim 14, wherein the operations further comprise:
    clearing the input disable region setting.

* * * * *